United States Patent
Knutsson et al.

(10) Patent No.: US 9,399,168 B2
(45) Date of Patent: Jul. 26, 2016

(54) METHOD FOR IMPLEMENTING A COMPUTER GAME

(71) Applicant: King.com Limited, St. Julians (MT)

(72) Inventors: Sebastian Knutsson, Stockholm (SE); Klas Norden, Stockholm (SE)

(73) Assignee: KING.COM LTD., St. Julians (MT)

( * ) Notice: Subject to any disclaimer, the term of this patent is extended or adjusted under 35 U.S.C. 154(b) by 274 days.

(21) Appl. No.: 14/029,245

(22) Filed: Sep. 17, 2013

(65) Prior Publication Data

US 2014/0080559 A1 Mar. 20, 2014

Related U.S. Application Data

(60) Provisional application No. 61/701,907, filed on Sep. 17, 2012, provisional application No. 61/811,019, filed on Apr. 11, 2013, provisional application No. 61/818,702, filed on May 2, 2013, provisional (Continued)

(30) Foreign Application Priority Data

| | | |
|---|---|---|
| Feb. 6, 2013 | (GB) | 1302121.7 |
| Feb. 19, 2013 | (GB) | 1302910.3 |
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
*A63F 13/00* (2014.01)
*A63F 13/40* (2014.01)

(Continued)

(52) U.S. Cl.
CPC ............. *A63F 13/10* (2013.01); *A63B 71/06* (2013.01); *A63F 13/00* (2013.01); *A63F 13/005* (2013.01); *A63F 13/12* (2013.01); *G06F 9/44* (2013.01); *G07F 17/32* (2013.01); *G07F 17/3274* (2013.01)

(58) Field of Classification Search
CPC ......... A63F 13/00; A63F 13/34; A63F 13/46; A63F 13/49
USPC .......................................... 463/10, 16, 31, 42
See application file for complete search history.

(56) References Cited

U.S. PATENT DOCUMENTS

| | | |
|---|---|---|
| 5,488,496 A | 1/1996 | Pine |
| 6,068,552 A | 5/2000 | Walker et al. |

(Continued)

FOREIGN PATENT DOCUMENTS

| | | |
|---|---|---|
| DE | 10304725 A1 | 9/2004 |
| EP | 1564698 A2 | 8/2005 |

(Continued)

OTHER PUBLICATIONS

Bejeweled 2, Wikipedia Article, 3 pages, printed Sep. 30, 2015.*

(Continued)

*Primary Examiner* — James S McClellan
(74) *Attorney, Agent, or Firm* — Saul Ewing LLP

(57) ABSTRACT

A method, implemented as computer code being executed by one or more processors, in which a computing device displays computer game graphics showing a gameboard with multiple game elements that are removed when matched or switched by a player, such as in a match-3, clicker or switcher game; and in which the processor(s) enables the game elements to evolve into visually altered versions when they form part of a match or switch and it is the altered versions that can be removed by subsequent matching or switching by the player.

35 Claims, 13 Drawing Sheets

Related U.S. Application Data application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(51) Int. Cl.
  *G07F 17/32* (2006.01)
  *A63B 71/06* (2006.01)
  *A63F 13/30* (2014.01)
  *G06F 9/44* (2006.01)

(56) References Cited

U.S. PATENT DOCUMENTS

| | | | |
|---|---|---|---|
| 6,117,013 | A | 9/2000 | Eiba |
| 7,073,792 | B2 | 7/2006 | Esposito et al. |
| 7,749,060 | B1 | 7/2010 | Olmes et al. |
| 8,002,633 | B2 | 8/2011 | Shimizu et al. |
| 8,088,010 | B1 | 1/2012 | Hill et al. |
| 8,237,743 | B2 | 8/2012 | Csurka et al. |
| 8,277,320 | B1 | 10/2012 | Hart et al. |
| 8,369,873 | B2 | 2/2013 | Krasner et al. |
| 8,526,490 | B2 | 9/2013 | Buckley et al. |
| 8,672,744 | B1 | 3/2014 | Steere et al. |
| 8,711,923 | B2 | 4/2014 | Buckley et al. |
| 8,727,893 | B2 | 5/2014 | Otremba et al. |
| 8,784,181 | B2 | 7/2014 | Frank et al. |
| 8,964,830 | B2 | 2/2015 | Perlman et al. |
| 9,033,803 | B1 | 5/2015 | Etter et al. |
| 2002/0068632 | A1 | 6/2002 | Dunlap et al. |
| 2002/0082068 | A1 | 6/2002 | Singhal et al. |
| 2002/0094870 | A1 | 7/2002 | Murray et al. |
| 2003/0049592 | A1 | 3/2003 | Park et al. |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0137987 | A1 | 7/2004 | Nguyen et al. |
| 2004/0224772 | A1* | 11/2004 | Canessa .............. A63F 13/12 463/42 |
| 2005/0256985 | A1 | 11/2005 | Shea et al. |
| 2006/0068876 | A1* | 3/2006 | Kane .............. G07F 17/32 463/16 |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0077993 | A1 | 4/2007 | Midgley et al. |
| 2007/0259709 | A1 | 11/2007 | Kelly et al. |
| 2008/0005353 | A1* | 1/2008 | Panabaker .......... H04L 67/125 709/238 |
| 2009/0170608 | A1 | 7/2009 | Herrmann et al. |
| 2009/0203415 | A1 | 8/2009 | Falciglia et al. |
| 2009/0209311 | A1 | 8/2009 | Bennett et al. |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0077580 | A1 | 3/2012 | Mahajan et al. |
| 2012/0079126 | A1 | 3/2012 | Evans et al. |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2013/0035164 | A1* | 2/2013 | Osvald ................ A63F 13/12 463/42 |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1 | 12/2013 | Shadduck et al. |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235338 | A1 | 8/2014 | Hansson et al. |
| 2014/0252987 | A1 | 9/2014 | Hinrichs et al. |
| 2014/0342791 | A1 | 11/2014 | Valeriano et al. |
| 2014/0357367 | A1 | 12/2014 | Lee |
| 2014/0370950 | A1 | 12/2014 | Jaksch et al. |
| 2015/0050997 | A1 | 2/2015 | Suzman et al. |
| 2015/0174489 | A1 | 6/2015 | Evald et al. |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| NO | WO 2010/045716 A1 | 4/2010 |
| WO | WO01/46790 A2 | 6/2001 |
| WO | 2006/052212 A1 | 5/2006 |
| WO | 2007/078533 A2 | 7/2007 |
| WO | WO 2007/078533 | 7/2007 |
| WO | WO 2008/109685 | 9/2008 |
| WO | 2009/029108 A1 | 3/2009 |
| WO | 2010/002897 | 1/2010 |
| WO | 2010/083346 A1 | 7/2010 |
| WO | WO 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO 2013174933 | 11/2013 |

OTHER PUBLICATIONS

Bejeweled, Wikipedia Article, 3 pages, printed Sep. 30, 2015.*
Bejeweled 2 Strategy Guide, by Conor Murphy, dated Aug. 15, 2010, available online at www.bigfishgames.com.*
Bejeweled 2 Video Game, published by PopCap, Released 2004.*
Anonymous, "Amazon Survival YouTube video, Uploaded to YouTube on Mar. 13, 2009, video length 6:06", https://www.youtube.com/watch?v=8S2gM5POUUk, Mar. 13, 2009, 1.
Anonymous, "Bejeweled article", Wikipedia, Sep. 30, 2015.
Anonymous, "Best iOS/Androiod cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.
Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.
Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.
Anonymous, "Candy Crush Saga Facebook Game levels 1-10 video on YouTube, YouTube screen shorts figures 1-7", https://www.youtube.com/watch?v=8TleNDnJiN8, Apr. 15, 2012.
Anonymous, "Candy Crush Saga for Facebook, YouTube video demonstrating levels 1-10, video length 15:23", https://www.youtube.com/watch?v=cfqHVkWX5yE, Apr. 12, 2012, 1 page.
Anonymous, "Candy Crush Saga on Facebook Review on YouTube video, Screen shots of YouTube video, figures 1-13", https://www.youtube.com/watch?v=AbH8Givg6XM, Sep. 7, 2012.
Anonymous, "Cross-platform", retrieved from the Internet: URL:http://en.widipedia.org/w/index.php?title=Cross-platform &oldid=487867404 [retrieved on Jul. 1, 2013] XP055068984, Apr. 17, 2012, pp. 1-16.
Anonymous, "Daily Bonus Level Oct. 17, 2012: Bubble Witch Saga Fan Site", retrieved from the Internet:URL:http://bubble-witch-saga.

(56) References Cited

OTHER PUBLICATIONS se/daily-bonus-level-17-oct-2012/ [retrieved on Mar. 21, 2014] XP055109244, Oct. 17, 2012, pp. 1-2.
Anonymous, "Dig Dug article", Wikipedia, Sep. 30, 2015.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.
Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.
Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.
Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.
Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.
Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=DpOhnHVKMxtoUM:&imgrefurl=http://www.ubergizmo.com/2009/07/king-com-skill-games-for-iphone-and-faceboo, Jul. 13, 2009, pp. 1-2.
Anonymous, "Minecraft", retrieved from the Internet: URL:http://en.widipedia.org/w/index?title=Minecraft&oldid=409326251 [retrieved on Jul. 1, 2013] XP055068987, May 2, 2014.
Anonymous, "Model-view-controller", retrieved from the Internet: URL:http://en.widipedia.org/w/index/php?title=Model%E2%80%93view%E2%80%93controller&oldid=511810952 retrieved on Oct. 8, 2013] XP055083072, Sep. 11, 2012, pp. 1-2.
Anonymous, "OpenOffice, Creating Charts and Graphs", Dec. 2004, 1-17.
Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.
Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.
Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.
Collins, "Will Collins Game Spotlight: Candy Crush Saga", retrieved from the Internet: URL:https://developers.facebook.com/blog/post/2012/06/15/game-spotlight--candy-crush-saga/ [retrieved on Oct. 25, 2013] XP055085345, Jun. 15, 2012, pp. 1-2.
Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.
Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010/10/tutorial-1-sokoban, Oct. 13, 2010.
Namco, "Dig Dug Video Game (copy unavailable)", 1982.
Popcap, "Bejeweled Video Game (copy unavailable)", 2001.
Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015] XP054975821, Apr. 15, 2012.
Schoenau-Fog, "The Player Engagement Process—An Exploration of Continuation Desire in Digital Games", http://www.digra.org/wp--content/uploads/digital-library/11307.06025.pdf, 2011.
Squires, "Bubble Witch Saga is going mobile—Gamezebo", retrieved from the Internet: URL:http://www.gamezebo.com/news/2012106127/bubble-witch-saga-going-mobile [retrieved on Dec. 9, 2013] XP055092339, Jun. 27, 2012, pp. 1-2.

* cited by examiner

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

1. Field of the Invention

The invention relates to casual social games.

2. Technical Background

There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has as social aspect—for example if it is linked to a social network so that game players can interact with their friends within the social network. The game can then transform into something that goes far beyond a solo game experience and becomes more like a shared journey.

'Viralisation' requires a game to include various techniques that encourage players to share the game with others, encouraging them to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed fro the game board. In a typical shooter game the physics of the game board being that the game pieces are falling downwards on the board.

There are also other types of games where groups of certain game elements are combined together and removed once they have reached a certain size. The user can connect the groups with a swiping movement touching each of the connecting elements in one implementation. In another implementation the groups are formed into one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DISCUSSION OF RELATED ART

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which a computing device displays computer game graphics showing a gameboard with multiple game elements that are removed when matched or switched by a player, such as in a match-3, clicker or switcher game;

and in which the processor(s) enables the game elements to evolve into visually altered versions when they form part of a match or switch and it is the altered versions that can be removed by subsequent matching or switching by the player.

Any one or more of the following optional features may be included, resulting in a method:

in which a processor is programmed so that visually altered versions are slightly larger versions of the original, unaltered game element in which a processor is programmed so that there are multiple levels of evolution of a game element, such as resulting in two or more visually altered versions of the original unaltered game element in which a processor is programmed so that once a game element has reached its final level of evolution, then matching or switching that element will cause that element to appear to explode or detonate in which a processor is programmed so that an exploding or detonating element causes all other elements of the same type or appearance, to evolve into a visually altered version.

in which a processor is programmed so that a goal of a level is to grow or evolve as many elements as far as possible in a certain number of moves, or a certain time limit.

in which a processor is programmed so that a goal of a level in the game is to cause a chain reaction by detonating several game elements, each having evolved to its final level of evolution in which a processor is programmed so that a game object, such as a farmer, hinders the player from growing and harvesting game elements by collecting all game elements that have evolved beyond a certain level.

in which a processor is programmed so that the elements are one or more of the following: vegetables, fruit, candies, flowers in which a processor is programmed so that the game is a match 3 game and the elements are peppers in which some or all game levels are untimed, eliminating any time pressure in which the game is a casual, social game and some or all levels have a true fail, to enable monetization through purchasing extra moves;

in which there is a continuous musical soundtrack plays during game play in which the game generates and displays congratulatory messages when the player scores more than a predefined amount, or matches more than a predefined number of game elements, in a single move in which there is an algorithm for automatically detecting when there are no possible moves left in which there is an algorithm for re-shuffling the elements on the game board.

in which a processor generates, if no move has been made for a while, help or hints by brightening and enlarging game elements used in a possible move on the board with a flashing animation, such as an animation that occurs once, or repeats twice or thrice in which a processor is programmed to require a player to reach a target score before running out of moves in order to complete a level successfully, but completing the level is not timed in which a processor is programmed to automatically replenish a life for a player in 30 minutes in which a processor is programmed so that, if a player finishes a level in under the target number of moves, then random game elements on the game board are triggered and give the player bonus points in which a processor is programmed so that, if a level is finished with moves left, those moves are converted to special game elements that trigger for extra bonus points in which a processor is programmed so that the game generates and displays congratulatory messages when the player scores more than a predefined amount, or matches more than a predefined number of game elements, in a single move in which a processor is programmed so that the player can ask his friends for lives in which a processor is programmed so that the player can ask his friends for other help in which social network friends are prompted to assist another player if that other player has played, but not completed, a level meeting a certain criteria in which a processor is programmed so that the player can send gifts to friends in which a processor is programmed so that the game can be synchronized between different devices in which a processor is programmed so that a player can seamlessly stop and re-start playing the game at any time since game state information is stored, e.g. remotely and/or on the playing device in which every change in the game state, such as every move of a game piece by the user, and every consequential change in every game piece on the game board, is accompanied by sound and visual feedback to provide immediate, positive gratification to the player in which game state information is preserved, enabling a remote server system to identify a player and all aspects of the state of the game they are playing, so that the player can end game play on one device and resume from a different device at a later time at exactly the same state in which the different device can be a different type of device, so that the player can move seamlessly between playing the game on a smartphone and on a tablet in which a remote server system can identify a player because that player has accessed the game through a social network in which the game is a casual, social game, namely a game that can be downloaded as an app to a smartphone and/or tablet computer and which can be accessed or played using a social network application or environment in which the processor is programmed to show a virtual path or other virtual world that indicates the level reached by the player and that player's social network friends in which the design of the game is optimised through a process including the step of: using data analytics to understand the impact of changes to the game design in terms of player engagement and/or monetisation and/or viralisation and; implementing changes to the game design, including frequent changes such as daily or weekly changes, to optimise player engagement and/or monetisation and/or viralisation.

A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device, showing a gameboard with multiple game elements that are removed when matched or switched by a player, such as in a match-3, clicker or switcher game;

and in which the processor(s) enables the game elements to evolve into visually altered versions when they form part of a match or switch and it is the altered versions that can be removed by subsequent matching or switching by the player.

A third aspect is:

A non-transitory computer readable medium encoded with instructions for controlling a computer system to display a game on a display, the instructions including instructions for enabling the display to show a gameboard with multiple game elements that are removed when matched or switched by a player, such as in a match-3, clicker or switcher game;

and in which the instructions running on the processor(s) enables the game elements to evolve into visually altered versions when they form part of a match or switch and it is the altered versions that can be removed by subsequent matching or switching by the player.

DETAILED DESCRIPTION

The terms user and player are used interchangeably throughout this document and no specific meaning is intended when using either term, unless the context suggests otherwise.

In the following description of various implementations of the invention, reference is made to the accompanying drawings, which form a part thereof, and in which is shown by way of illustration, various implementations in which the invention may be utilized. It is to be understood that other implementations may be utilized, and structural and functional modifications may be made without departing from the scope of the present invention.

Figure 1:
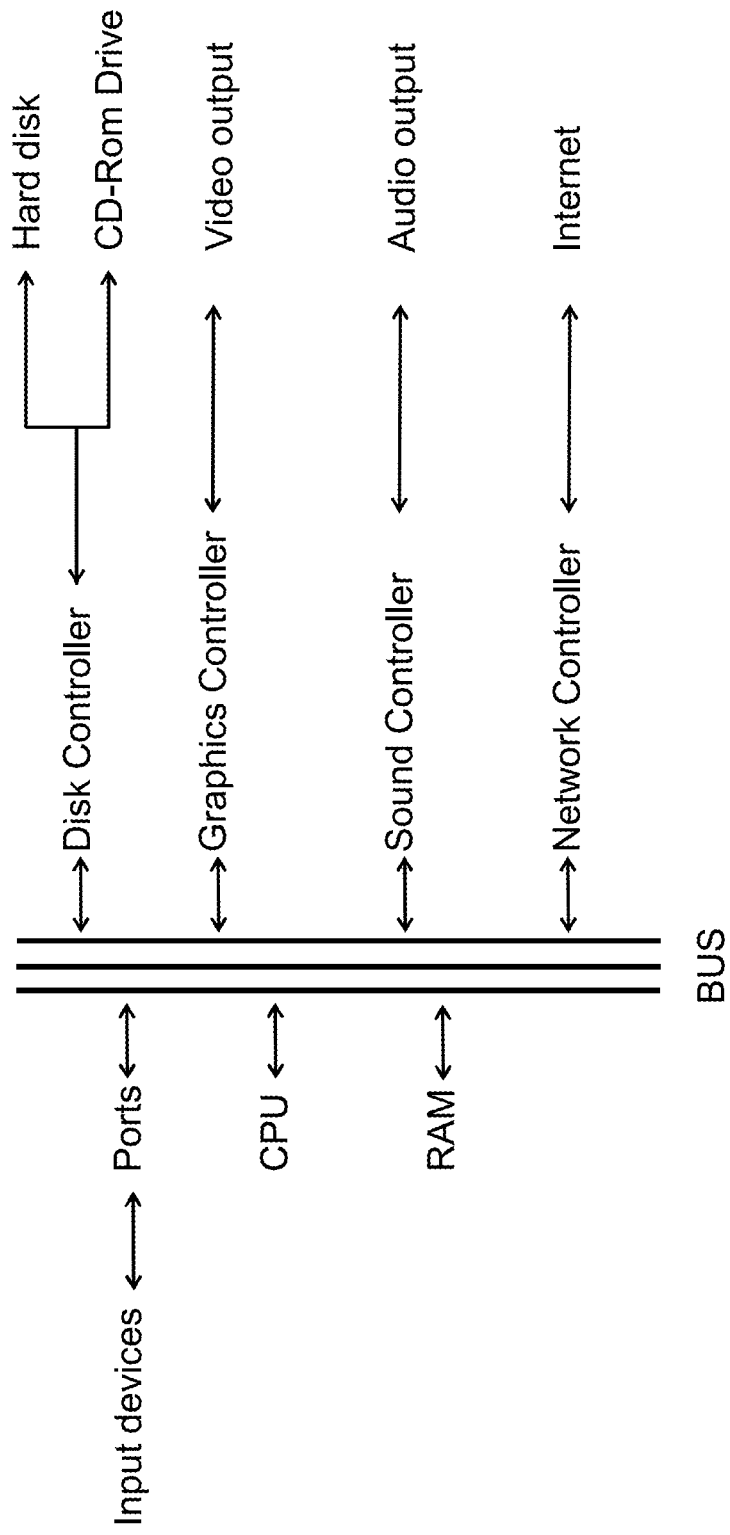
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates for instance, with the internet, through wireless or wired connections. A user can interact with the computing device through input devices, such as a pointing device (e.g. a mouse) and a keyboard.

Figure 2:
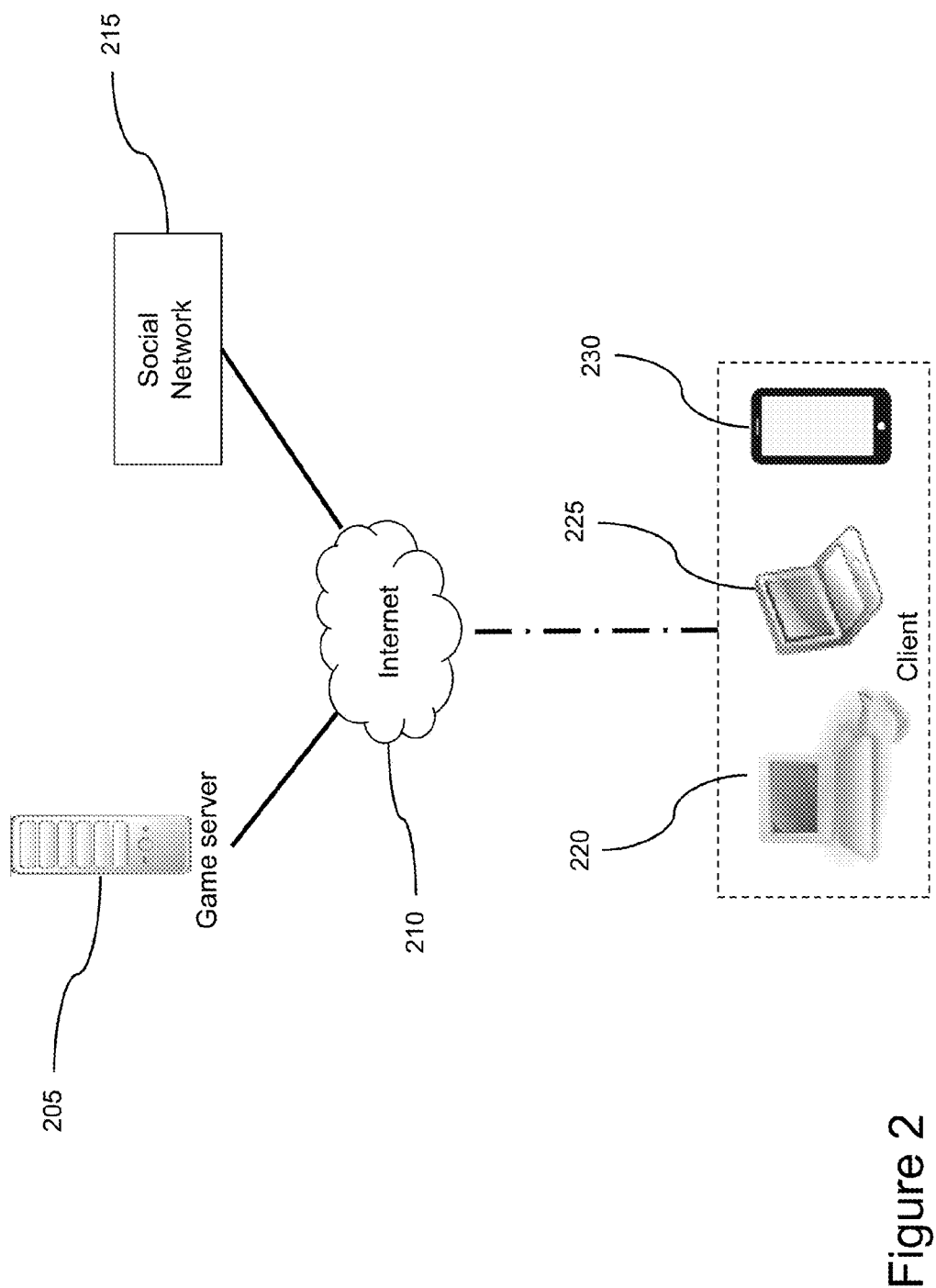
FIG. 2 shows an exemplary environment.

FIG. 2 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other networks. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference. People skilled in the art will understand that other devices, than the exemplary ones listed, can be also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture, but can be deployed on any suitable game architecture.

The game can be implemented allowing a user to interact with it in different ways depending on the capabilities of the device which the user is accessing the game with. A user can interact with the game through using a touch screen, where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network with which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game are not exhaustive, what is described herein are certain preferred embodiments. It is possible to implement the game in a number of variations without departing from the spirit or scope of the invention.

Game Goals

The game described herein is a switcher based match 3-game, which means that the player has to make combinations of at least three game objects of the same type. In a typical match 3 game, matched objects will disappear and give the player points. In this game, the matched objects will, instead of disappearing, grow into a more advanced object of the same type that was combined. In a typical implementation the game objects that are to be combined are peppers.

The goal of the game can differ depending on the level. Generally the player has to try to grow as many peppers as large as possible before running out of moves or time, or until a pre-determined number of objects have been harvested. Collecting a pre-determined number of objects is one common game goal, another is to create a chain reaction of peppers. How to do this is described later in this document.

Game Rules

Figure 3:
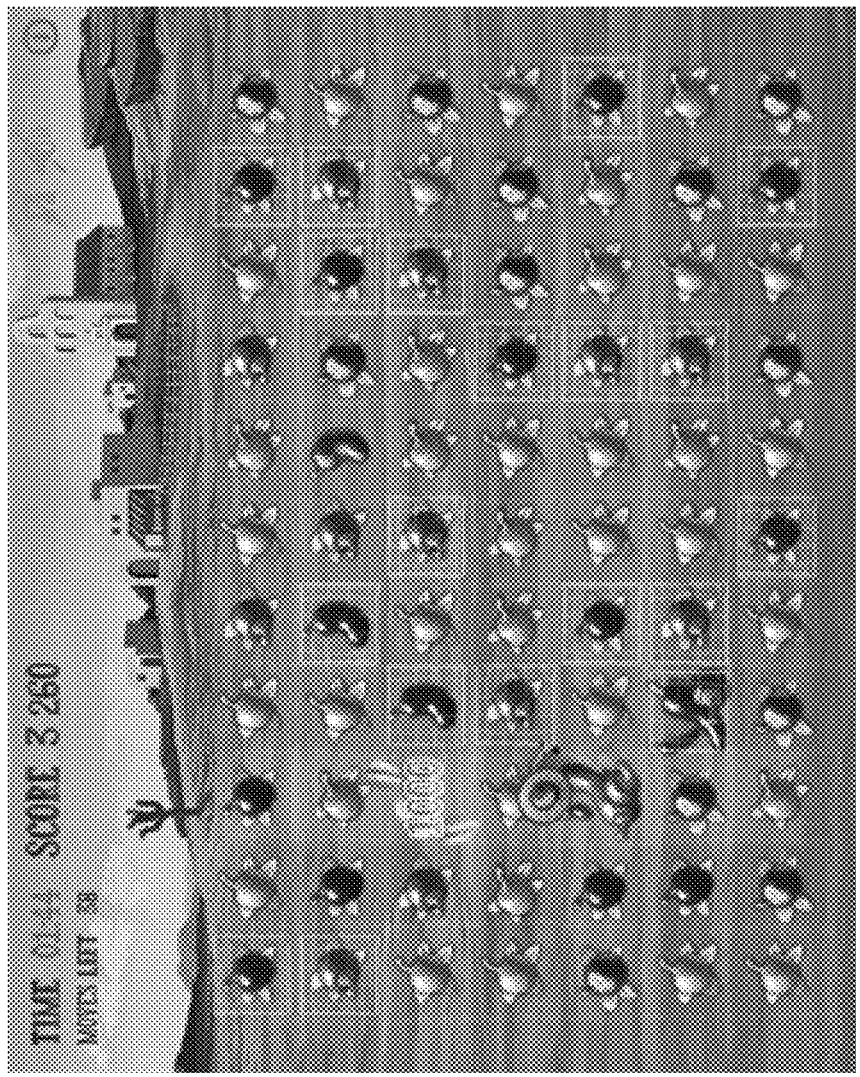
FIG. 3 shows an exemplary embodiment.
Figure 4:
FIG. 4 shows an exemplary embodiment.

In a typical implementation, the peppers have 6 different sizes. Create rows or columns with 3 or more peppers of the same colour to make them grow. Click or drag the peppers to make peppers switch places. When combining peppers, they will grow according to the following formula: Final size after a match=Total levels in peppers in match+number of peppers in match−2. Two exemplary implementations are shown in FIG. 3 and FIG. 4.

In one game mode, the player has to collect a certain number of peppers. This is done by making combinations so that the peppers grow and then by making them pop by combining them when at their final level.

Another game mode is for the player to create a certain number of 'Pepper Panics'. How to create a Pepper Panic is further described elsewhere in this document.

In another game mode, an antagonist will try to hinder the player from growing and harvesting peppers. In this game mode, after each switch, the antagonist moves one column or row and harvests all peppers of size 2 or bigger. The antagonist then moves to the next column and waits for the player's next move. The player has to try to stop the antagonist harvesting their peppers before they reach their full size by shifting them out of his way. The player may also buy a booster to shield the pepper from being taken by the antagonist.

Figure 5:
FIG. 5 shows a chain reaction of game elements.

Something that is common for most game modes is that if the player manages to grow a pepper to its full size it will start to burn and then it will pop. When it pops it spreads its seeds to all peppers of the same colour and makes them grow one size. This means that, with some planning, the player can start chain reactions of burning peppers. FIG. 5 shows when a player has achieved a chain reaction.

If the player gets several pepper fires in a row they will enter 'Pepper Panic' mode. A piñata with a meter appears on top of the board. The player must try to fill the meter by getting 10 fires in a row. When the player succeeds with this they have reached a Pepper Panic. If playing the mode with the farmer, a Pepper Panic knocks out the farmer for two moves. The player is also rewarded with 100,000 points as a Pepper Panic bonus. The player needs to plan wisely so that they can start chain reactions of fires.

There are a number of special combos that will help the player in their quest for full sized peppers. Depending on the game mode there can be slightly different implementations of combos, in a typical implementation of a game mode with the farmer the following combos apply:

If you match 4 peppers of same colour it will send out a wave making all peppers of size 2 or bigger, independent of type, on the same line or column grow one step.

If you match 5 peppers in a L- or T-shape all peppers of same type will get a shield protecting them from the farmer one time.

if you match 5 peppers in a straight line all peppers of same type will get a shield and they will grow one step.

In other game modes, typically without the farmer, the following combos are available:

Matching 4 peppers will have the same effect, sending out a wave to make all peppers of size 2 or bigger on the same line or column grow one step.

Matching 5 peppers in a L- or T-shape will boost all peppers of size 2 or bigger in both two directions, emanating from the L and T-shapes.

Matching 5 peppers in a row will cause all peppers of the same kind to grow one step.

Causing 6 peppers to pop in a row will cause all peppers of the same kind to grow one step.

Causing 10 peppers to pop in a row, and subsequently achieving Pepper Panic, will cause all peppers of size 2 or bigger to pop and gives a bonus for all peppers on the game board based on their size.

In some implementations, typically in a skill-based game platform where the player competes against other players, the number of switches in the game is limited to 40. There can also be a 2 and a half minute time limit for the game. The game will end when the player runs out of moves or time.

Game Controls

In implementations on a computer, the game is typically controlled with the mouse. Click or drag the peppers to make them switch places. The player cannot make a new move until the peppers have stopped falling or the farmer has stopped moving.

If the player wishes to end the game prematurely they can press End Game at the top of the screen. The sound can be toggled On or Off.

In other implementations, for instance ones on mobile devices with touch screens, the controls can differ. Instead of using the mouse, players can typically use the touch based controls of a mobile device to switch places of the peppers, for instance by using a finger or a stylus.

Game Scoring

The game scoring can differ depending on which type of mode the player chooses. The scores below are used in a typical implementation where the player competes on a skill-based platform.

Combos

Points are given for each combo made. Bigger combos give more points.

pepper combo=200 points
pepper combo=400 points
pepper combo=600 points

For every match created by the same move a multiplier is added. The first match will get the listed score, the second will get 1.1×, the next match the multiplier will be 1.1×1.1=1.21 and so on.

Harvested Peppers

The player gets points for harvested peppers. Score depends on the size of the pepper. No points are given for un-grown peppers (size 1) so the player needs to make them grow in order to get points.

The Peppers have 6 different sizes:
size 1=0 p
size 2=1000p
size 3=2000p
size 4=3000p
size 5=5000p
size 6=7500p Pepper Panic When the peppers reach full size they start to burn and then pop. If the player manages to start 10 fires in a row they get a Pepper Panic bonus.

Pepper Panic Bonus=100,000 points.

All grown peppers are harvested and you get half their normal score.

The farmer is knocked out for two moves if playing a game mode with the farmer.

Strategy

There are several strategies to follow in the game, some of them depending on the game mode. General strategies include:

Try to keep grown peppers out of the farmer's path.
Look for special combos in order to protect the peppers and to make them grow faster.
Peppers that have sparkles around them will start to burn if they grow one more time.
Try to have several sparkling peppers before starting a fire in order to make a chain of fires and get a Pepper Panic.

Tips for Improving Score

If the farmer is moving to the right try to find combos on the left hand side of him and vice versa. A 4-combo can trigger sparkling peppers of other colours. This is a good way of starting chains of fires.

Always keep an eye out for 5-combos. The L/T-combo will protect your peppers with a shield and the straight 5-combo will give your peppers a shield and make them grow. This is essential for a good score. Sometimes it can be good to start a single fire just to make all peppers of one colour grow.

Boosters

The game can be implemented with different boosters and different blockers. Below is an example of different boosters that can be implemented.

| Booster name | Function |
| --- | --- |
| Switcher | Switches two peppers without making a match |
| Hammer | Removes a single pepper or ice block |

-continued

| Booster name | Function |
| --- | --- |
| Fire | Grows a pepper three stages, can remove ice |
| Fish | Stops the cat for two turns |
| Net | Protects one pepper from the cat once |
| 5 extra moves | Adds five moves to the user's 'moves remaining' count |

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API, which allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game

Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, have a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new tides.

Virtual Map

Figure 6:
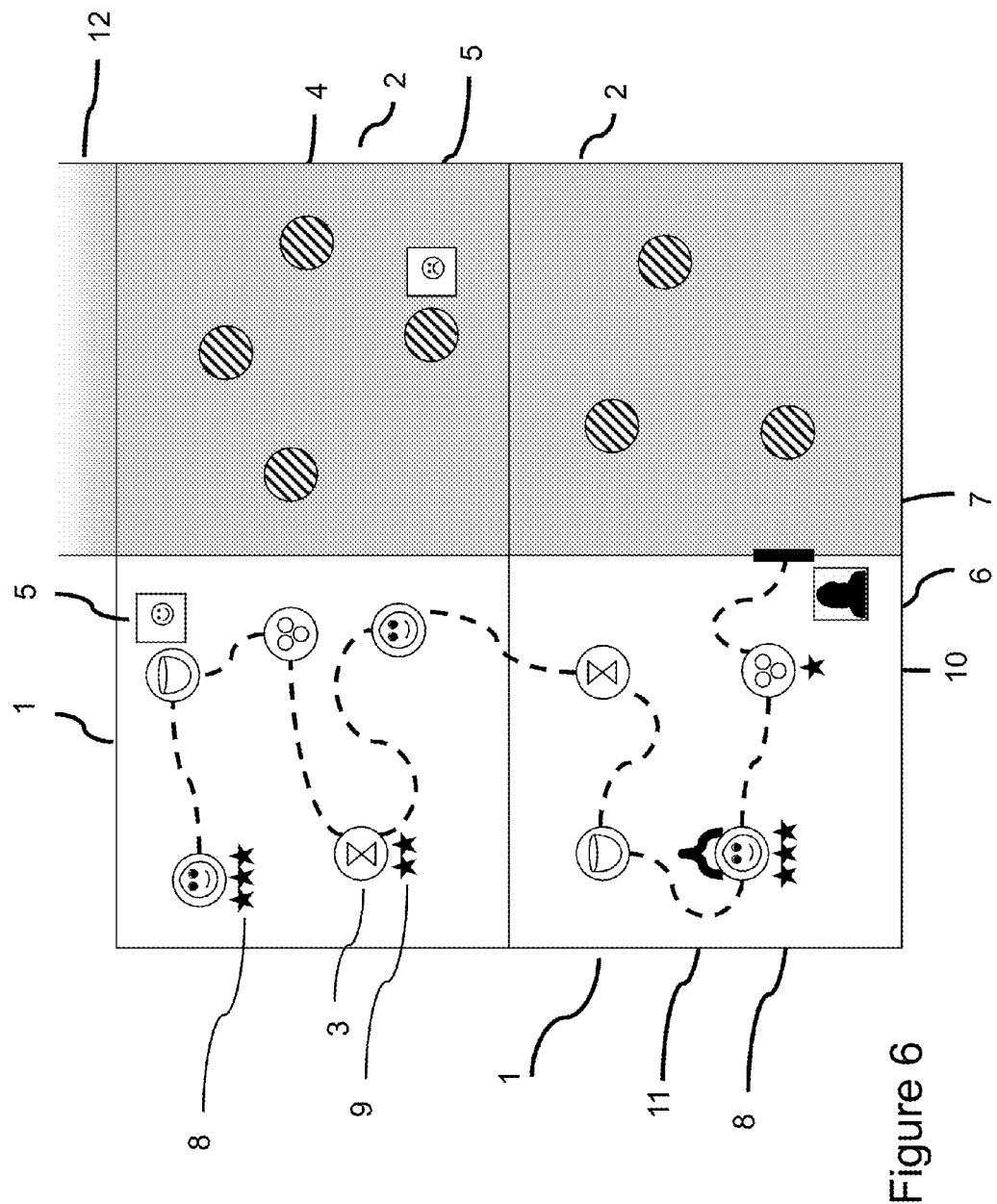
FIG. 6 shows a virtual map.

The game can be implemented so that a player progresses through multiple levels of changing and typically increasing difficulty. FIG. 6 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friends and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through the use of 'Mystery Quests', which gives the player the option of completing one or several challenges to unlock the block. Such challenges can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to which the game is connected. This is one of the viralisation techniques implemented in this game.

In addition to the virtual map layout in FIG. 6, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level —highly skilled gameplay can win the user three stars) or paying virtual currency to unlock the stage or level.

The map layout in FIG. 6 may be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people who are not friends on the social network, but that meet other certain criteria.

The user can play any of the unlocked levels on the map, so the user can go back and replay already completed levels to get a better score or beat friends' high scores.

In some implementations of the game the player is rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific completed levels, and can also give the player an idea of what to expect before actually starting a level. In a typical implementation, thumbnails cannot be displayed for levels that have not yet been unlocked. If trying to view one of these a symbol of a padlock will be in the place where the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, has the highest score.

There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences, which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 7:
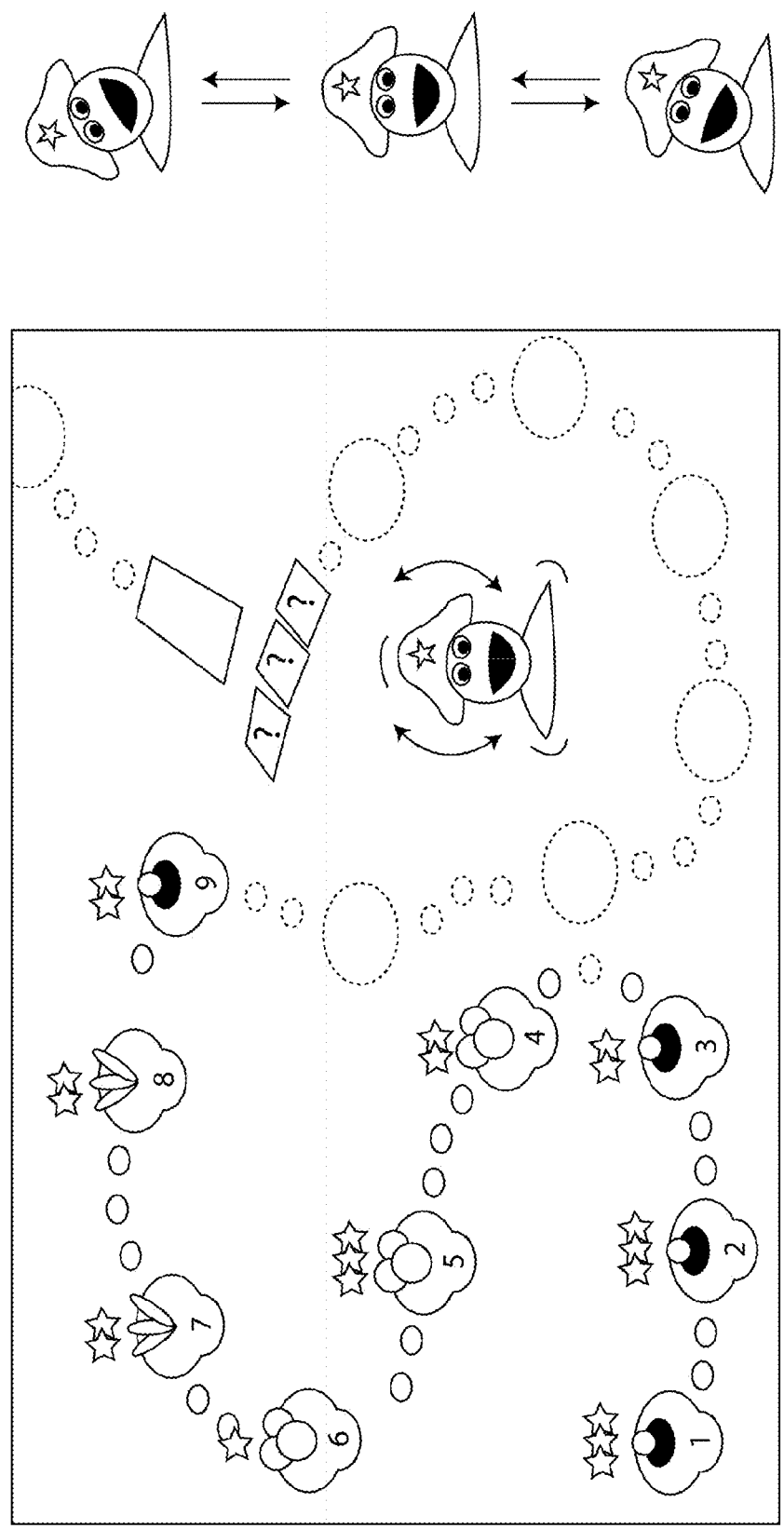
FIG. 7 shows an animated sequence on a virtual map.

One example of how the virtual map can be dynamic and moving is shown in FIG. 7 where as an example, a coconut character moves slightly from side to side. A collection of subtle as well as less subtle animations throughout the map will together make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 8:
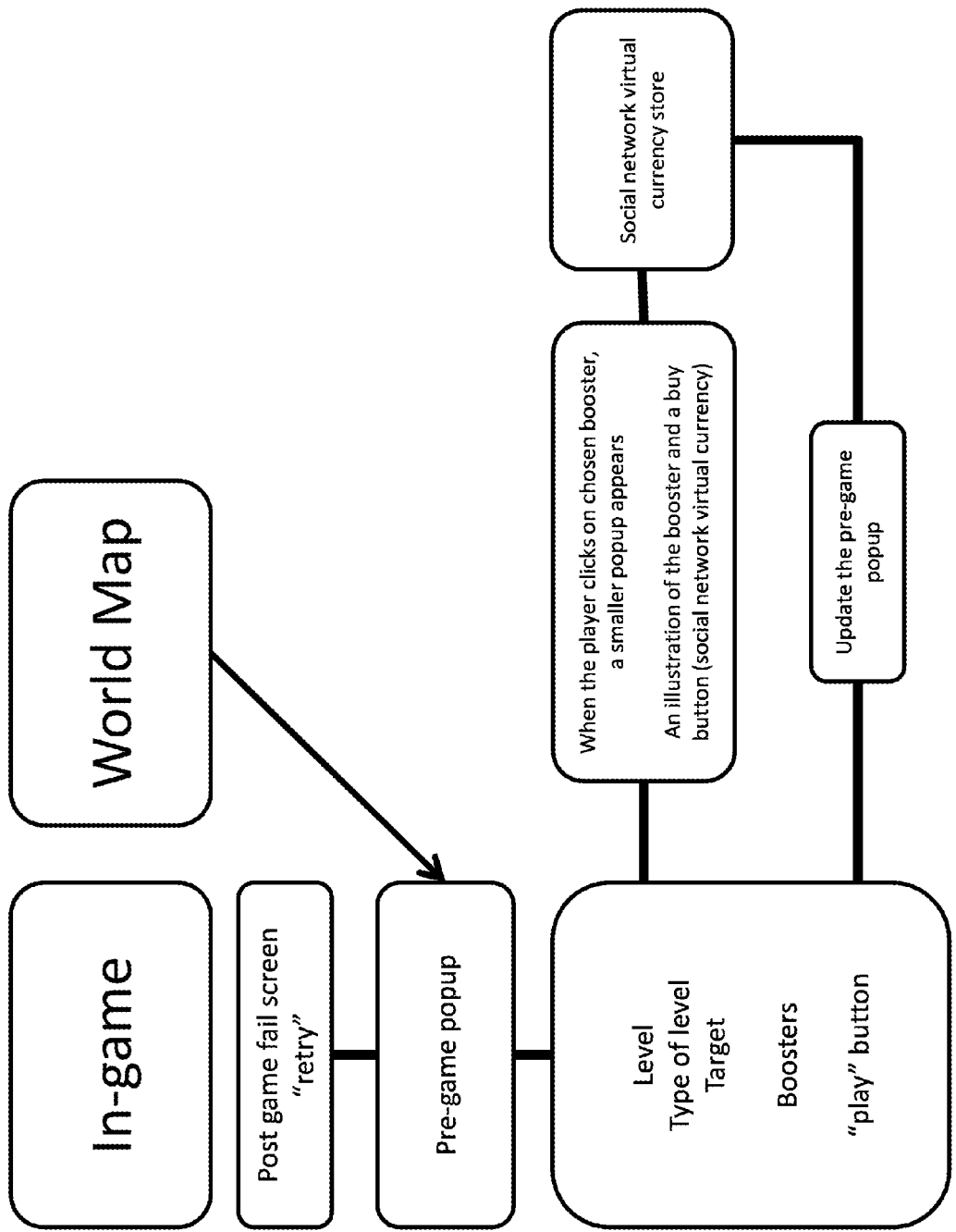
FIG. 8 shows pre-level game progression.

FIG. 8 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 9:
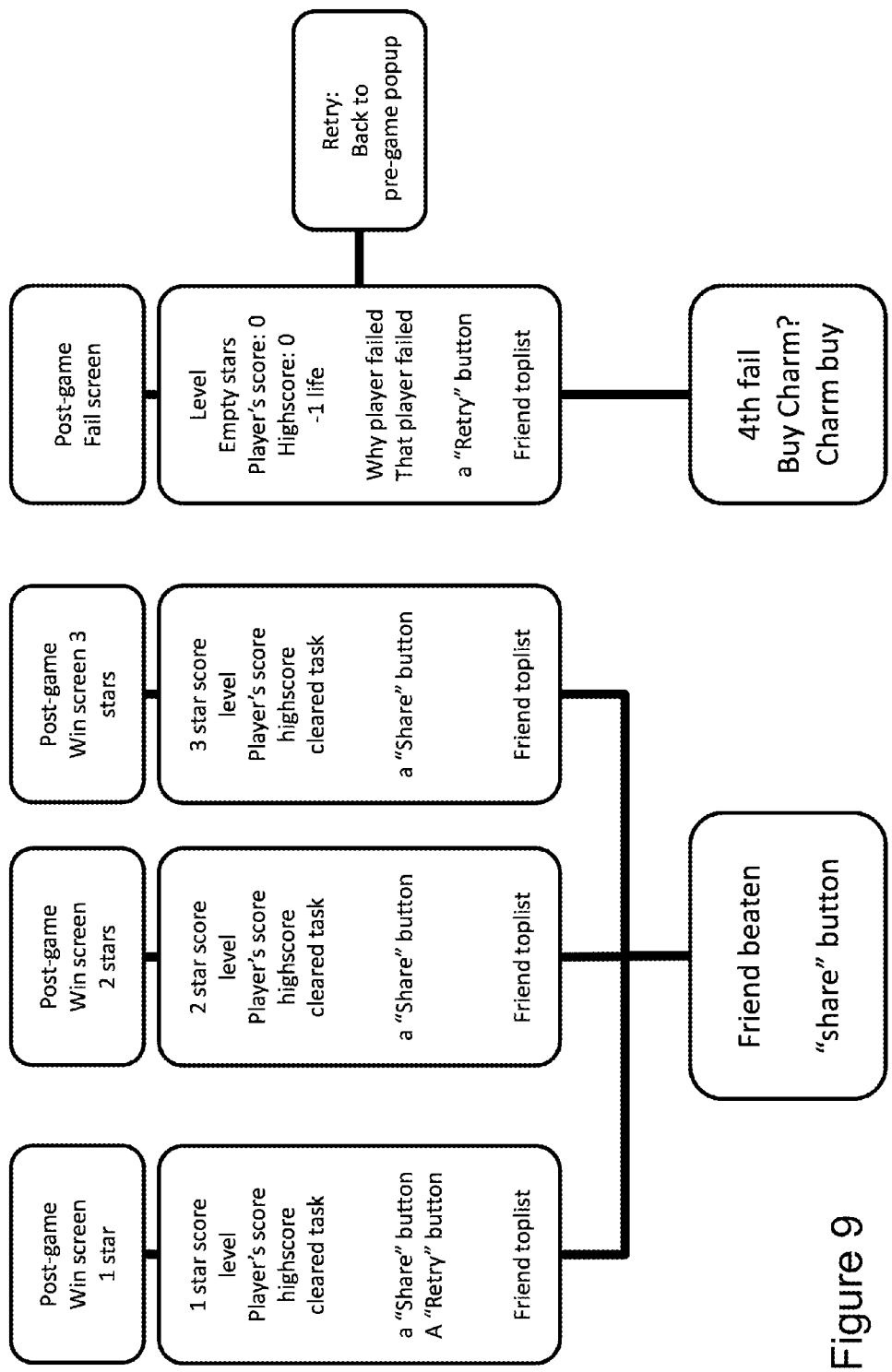
FIG. 9 shows post-level game progression.

After completing a level, the player is presented with a screen that shows the amount of points gained, the amount of stars achieved and also the previous highscores of friends. One implementation of the game flow related to the post-level screen is shown in FIG. 9.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 10:
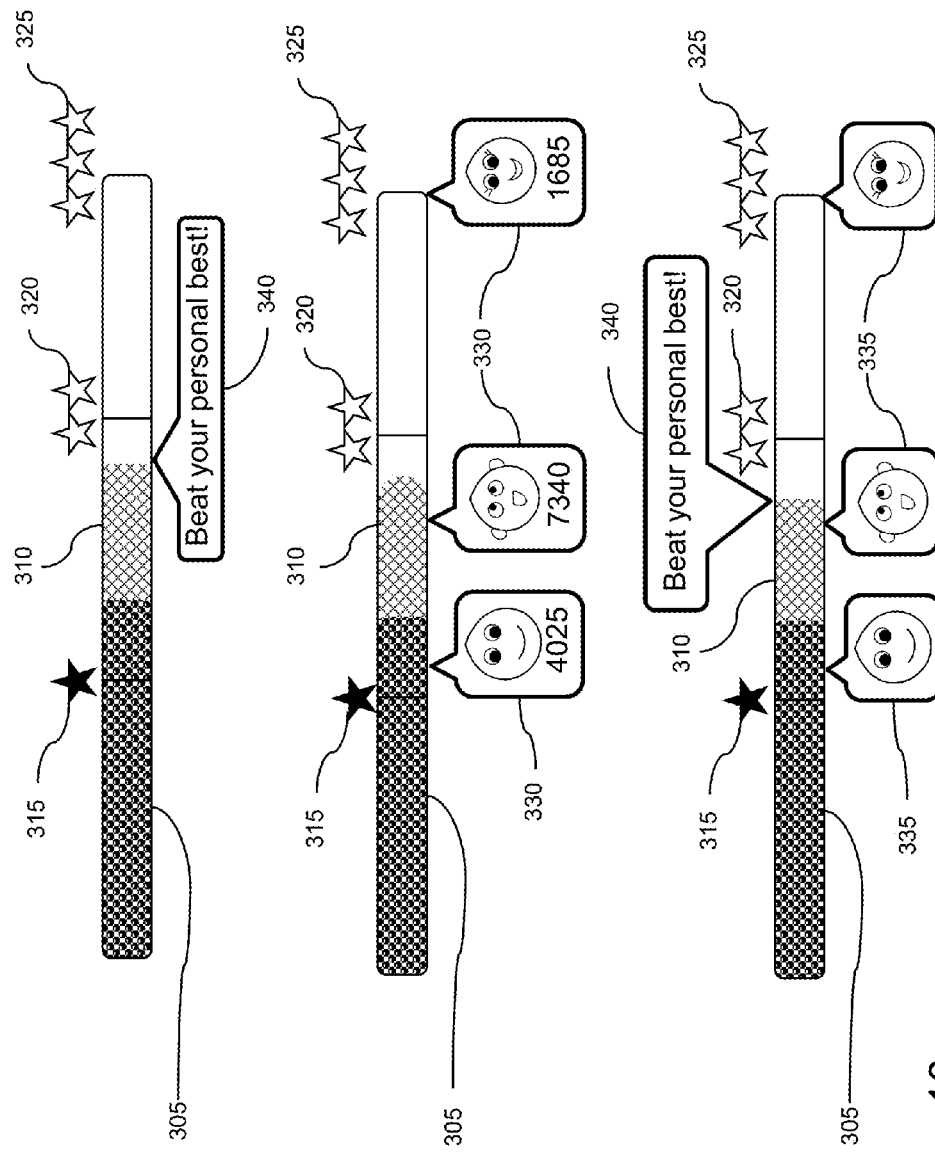
FIG. 10 shows different ways of implementing a score meter and the results of other players.

In some implementations, the player can see indications of the previous high score achieved on a level while playing it, shown by 310 in FIG. 10. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 10. When the player passes the score of another player or the previous best score the player has achieved, a message can be shown to encourage the player and denote the accomplishment. One example of such a message is illustrated by 340 in FIG. 10.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on whether the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 11:
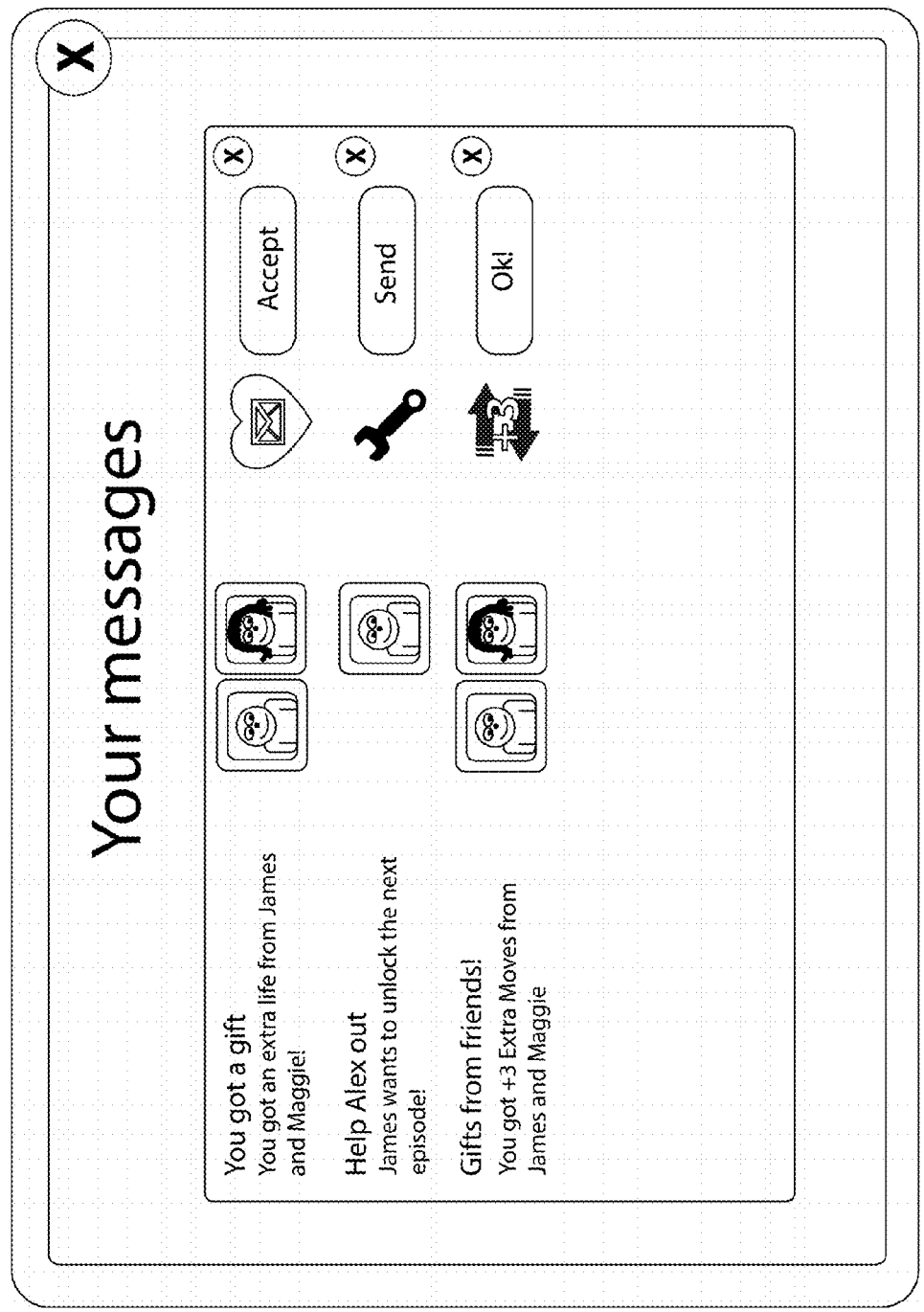
FIG. 11 shows an implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 11 shows one example of an implementation in which the player is prompted by the game to send lives or other help to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 12:
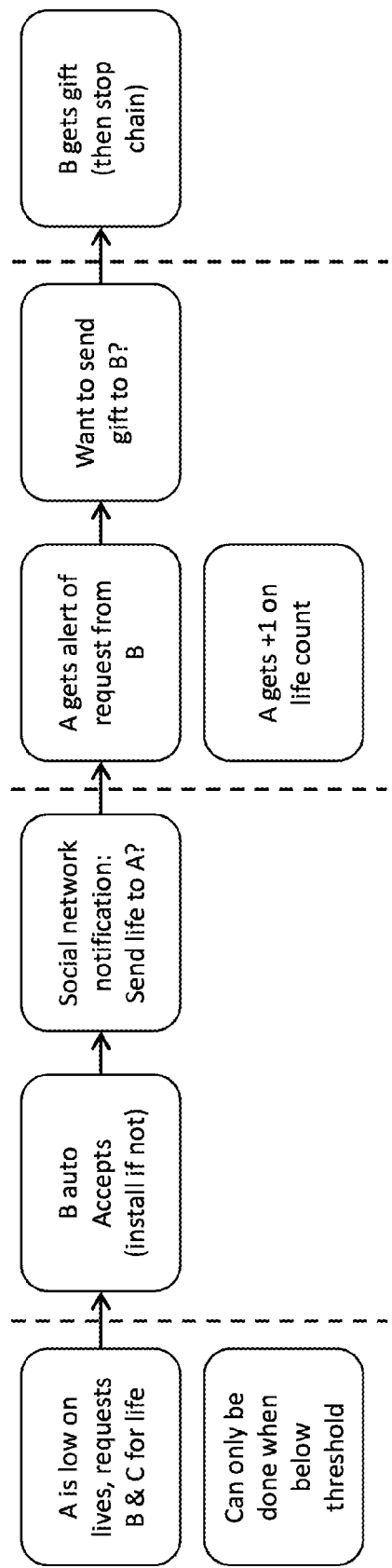
FIG. 12 shows an implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 12.

It is also possible to buy gifts in the in-game shop and send these to friends. Such gifts are in the form of boosters that can be used either during a level or before a level. Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 13:
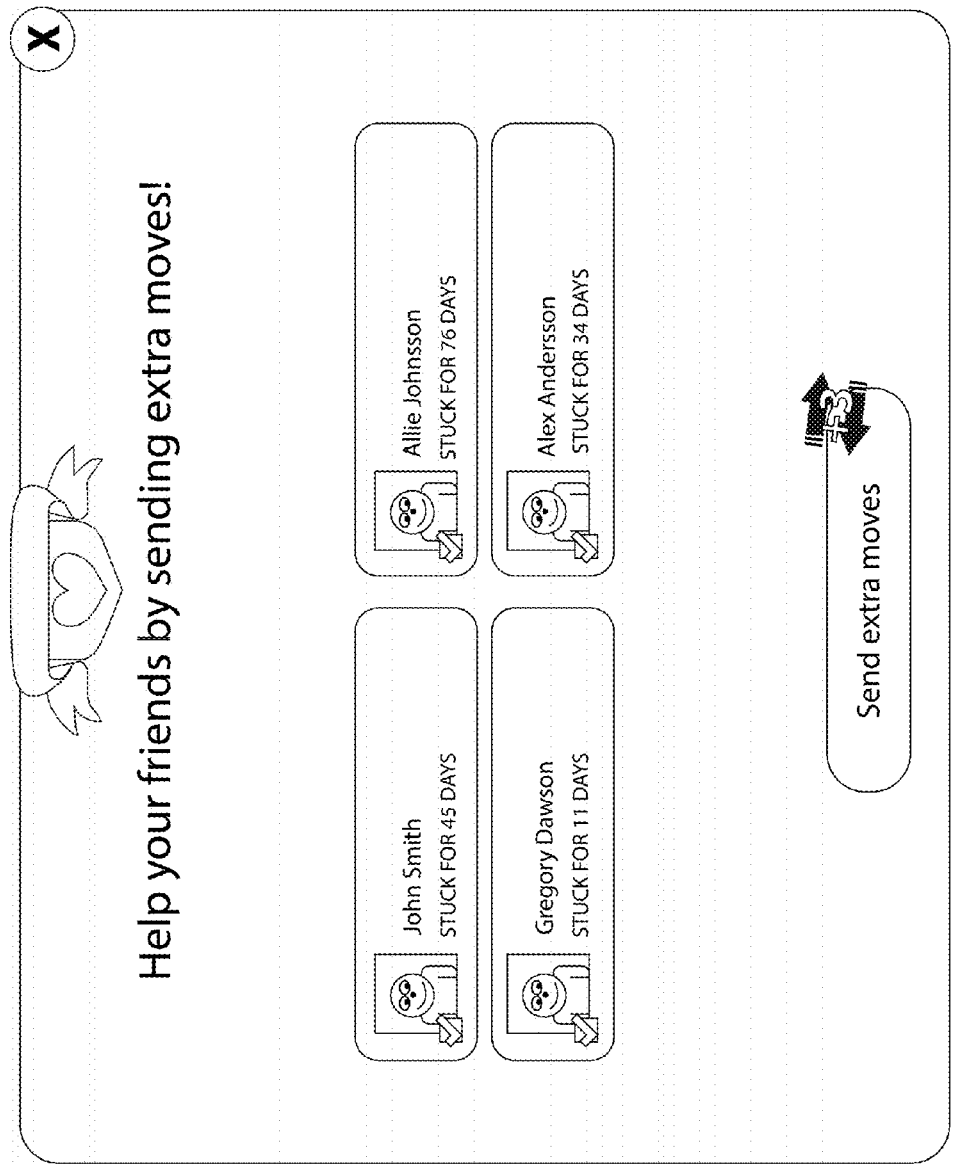
FIG. 13 shows the game prompting the player to help friends that have been stuck for an extended period of time.

The prompting from the game can happen at different points in the game, for instance when a player logs onto the game. Such prompting is illustrated in FIG. 13. The prompting increases engagement by increasing the likelihood of someone providing help to players when the game is particularly difficult, it also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots, where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and In-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smart phones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that are active on a computer-based platform could get a bonus for also installing the game on a handheld device. Such bonuses may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one and other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store, storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not to interfere with for instance the times of the day that players are as most active.

If trying to access the game online, as opposed to starting a local version that is saved on the device, while updates are being made, the player can be met by a message saying that the game cannot be accessed at that moment.

Concepts

A gaming system in which functions and features relating to sharing players' game state information, including levels and achievements, on a virtual path (or other virtual world) with that player's social network friends is continuously or regularly optimised for engagement and monetisation by continuously or regularly monitoring and analysing player behaviour and interaction, such as monetisation.

A gaming system in which a single user database, which may be distributed or centralised, tracks all metrics for all players, including all game state information, irrespective of the platform used by each of those players, and that single user database is accessible by several different games, such as a match 3 switcher and a match 3 clicker, a bubble shooter etc.

A casual, social game connected to a player's friends through a social network, in which every change in the game state, such as every move of a game piece by the user, and every consequential change in every game piece on the game board, is accompanied by sound and/or visual feedback to provide immediate, positive gratification to the player.

A match 3 switcher game, in which players can see their own and also their social network friends' game level position on a virtual path (or other virtual world) and in which game state information is fully sync'd across different platforms, such as iOS, desktop and Android via Facebook, so that a player can seamlessly stop and re-start playing the game on any of those different platforms.

A match 3 switcher game, in which a player's score and game level position and also the scores and game level positions of all their social network friends also playing the game, is fully sync'd across different platforms, such as iOS, desktop and Android via Facebook.

A match 3 switcher game, in which players can see their own and their social network friends' game level position on a virtual path (or other virtual world) and, in which each level of the game can be failed and, if a level is failed, the game automatically offers the player extra moves to purchase, to carry on playing the game.

A match 3 switcher game, in which players can see their own and their social network friends' game level position on a virtual path (or other virtual world), in which in-app purchases are bought for real or virtual currency by touching an icon of the booster shown next to the gameplay board, and then touching a 'buy' button that is subsequently displayed.

A match 3 switcher game, in which a player's score and game level position and also the scores and game level positions of all their social network friends also playing the game, is fully sync'd across different platforms, such as iOS, desktop and Android via Facebook, and there are sections of the game that must be unlocked through either help from those friends or through a purchase.

A match 3 switcher game, connected to a player's friends through a social network, in which friends can send gifts, boosters, extra moves, or extra lives to one another.

A match 3 switcher game, in which players can see their own and social network friends' game level position on a virtual path (or other virtual world) and where a visual prompt is displayed by the game if a friend's high score has been beaten by that player, the prompt enabling the player to send a message to that friend.

A match 3 switcher game, in which players can see their own and also their social network friends' game level position on a virtual path (or other virtual world), where the player can play the game in offline mode on one platform/device and the progress in the game and other game state information is synchronised with a remote server when the device is online again and the player can continue playing the game on another platform.

A match 3 switcher game, in which players can see their own and their social network friends' game level position on a virtual path (or other virtual world) and the game enables the player to buy a permanent booster which can be used without limit in time.

A match 3 switcher game, in which players can see their own and their social network friends' game level position on a virtual path (or other virtual world), in which successive levels have different difficulty rankings to introduce variety even without a new game mechanic being introduced—e.g. after a difficult level, there is an easier level.

A match 3 switcher game, connected to a player's friends through a social network, where some or all of those friends are sent a message prompting the friend(s) to assist the player once that player has played, but not completed, a level, for more than a predefined time or predefined number of attempts.

A match 3 switcher game, or other kind of social, casual game, in which players can see their own and their social network friends' level position on a virtual path (or other virtual world) and where the player is prompted to notify a social network friend when the friend's high score on a specific level has been beaten by that player.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster, and where the game state information relating to the acquisition or use of an acquired item is synchronized across several different platforms.

A match 3 switcher game, in which players can see their own and their social network friends' game level position on a virtual path (or other virtual world) and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the game board to the bottom.

A match 3 game in which the player has to satisfy multiple criteria within a limited number of moves to complete the level; in which the criteria include at least two of the following:
Reaching a target score,
Removing matchable game elements to clear a path for a non-matchable game element to reach a predefined area on the game board,
Clearing a predefined number of a certain type of game items layered on the game board having a matchable game element, together with each of the layered game items, where each layered game item can be removed by removing a matchable game element in the same position as the layered game item.

A match 3 switcher game in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

UA casual online game connected to a social network in which players can see their own and their social network friends' game level position on a virtual path (or other virtual world) with nodes representing levels in the game, and each node can reveal, in response to user input, a graphical preview representation of the game board for that level and, if the player has played that level before, a visual indication of how well the player succeeded on that level.

A match 3 switcher game in which, after a player has failed to meet the level completion criteria, a message is shown articulating why the level completion criteria was not met, and offering as the only visually significant option to replay the level.

A match 3 switcher game in which, after a player has achieved the level completion criteria, a message is shown articulating that the level was successfully completed, and offering as the only visually significant option to share information to a social network.

A match 3 switcher game in which, when matching 3 or more of the same type of game element the matched game elements are removed from the game board and replaced with a game element from the same type of game elements that has a higher stage. When including the newly introduced game element in a new combination, replacing it with another game element of a further higher stage, once the introduced game element reaches a certain stage it is removed and all game elements of the same type on the game board are upgraded one level.

NB Each of the above concepts can be combine with any and all of the other high-level concepts. Also, although the high-level concepts are generally defined in relation to a match 3 -switcher game, the concepts can be deployed in other game variants (e.g. clicker games).

NB Each of the above concepts can be combined with any and all of the other high-level concepts. Also, although the high-level concepts are generally defined in relation to a specific type of match 3-switcher game, the concepts can be deployed in other game variants (e.g. clicker games, match 3-switcher games, bubble shooter games, puzzle games).

Key Features Shared Across all High-Level Concepts

Game elements are the game pieces that are used in the match 3 switcher game

Game elements are shiny, reflective, brightly coloured candies, but the background gameplay region is dark and matt, so the game elements readily stand out, reducing cognitive load.

Some or all game levels are untimed, eliminating any time pressure; (e.g because a player can seamlessly stop and re-start playing the game at any time since game state information is stored, e.g. remotely and/or on the playing device)

Some or all levels have a true fail (which enables monetization through purchasing extra moves; true fails in casual games are rare because the assumption to the designer is that it will put people off playing the game; the game manipulates the fail condition to make it feel agreeable).

Virtual path is through a candy-themed fantasy map
Continuous musical soundtrack plays during gameplay
Game generates and displays congratulatory messages when the player scores more than a predefined amount, or matches more than a predefined number of game elements, in a single move
Failing a level is accompanied with a soothing, whistling soundtrack There is always an available match-3 switcher move, readily seen by the average player, which will score some points, whilst higher scoring moves are randomly available.

Games are played using software downloaded to an end-user device such as a smartphone, tablet, PC or laptop, or running remotely on a server, or a combination of the two, with the software running on one or more processors. The processor controls or is involved with all gameplay, game interaction, graphics displays, communication, interaction with social networks, synchronization across platforms, data storage, game state information. Games are played using a hardware gaming system comprising processors and data memories, the system including multiple end-user devices, such as smartphones, tablets and PCs, as well as remotely connected servers, the gaming system enabling the games defined above to be played on the multiple end-user devices.

The game is defined using non-transitory computer readable medium encoded with instructions for controlling a hardware gaming system to display and enable users to play the games defined above.

Other Concepts

A match 3 -game, fully sync'd across platforms, having an algorithm for automatically detecting when there are no possible moves left.

A match 3 -game, fully sync'd across platforms, having an algorithm for re-shuffling the elements on the game board.

A switcher-based match 3-game fully sync'd across platforms, having sections which must be unlocked with the help of friends or through a purchase.

A switcher-based match 3-game, fully sync'd across platforms with at least 3-5 different goals for completing different levels.

A switcher-based match 3-game, fully sync'd across platforms, having a limited amount of lives that can be replenished either by waiting or by purchasing new lives.

A switcher-based match 3-game fully sync'd across different platforms.

A match-3 switcher game that offers users to buy permanent boosters, which can be accessed one or more times for each time playing a level or once a day.

A match-3 switcher game which is connected to the player's friends through a social network and where friends can send gifts to each other.

A match-3 switcher game which is connected to the player's friends through a social network and where friends can help each other by sending extra moves or extra lives.

A match-3 switcher game which is connected to the player's friends through a social network and where friends can help each other by sending various boosters and where the help sent can only be used on the level the player is stuck on.

A match-3 game that has a sign in the shape of a bow tie or ribbon next to those level nodes on the visual path where help from the player's friends.

A match-3 game where there are six standard game elements to switch in the shape of game elements.

A match-3 switcher game where the player's Facebook portrait moves along a virtual path when progressing through the game.

A match-3 game where there is a map showing the progress of the player and where the map looks like a foldable physical game board which has been place on top of a table.

A match-3 game where the player moves along a virtual path and where the path moves through different candy themed areas, where each area has its own sub-story with an intro and an end when entering and exiting each area respectively.

The switch-based match 3 game, comprising a special game element, which, variable in its character, can be automatically moved and combined with other game elements into a match combo, or is locked in the blocker that is required to be unlocked first.

The switch-based match 3 game, comprising a special game element, which, variable in its character, can remain as the same special game element after combinable moves are taken.

The switch-based match 3 game, comprising a special game element, which, variable in its character, can transform into a random game element that can either yield a combo to remove the game elements or yield an obstacle to block the combo, depending on the game elements its combined with.

The switch-based match 3 game, comprising a special game element, which can transform into another special game element that, when combined with other game elements, yields a special combo effect to remove all the game elements in a row and/or column, or a bigger area more than a layer.

The switch-based match 3 game, comprising a special game element, which can transform into another special game element that, when combined with other game elements, yields a special combo effect to remove game elements of the same colour.

The switch-based match 3 game, comprising a special game element, which can transform into another special game element that is not playable or movable unless it is unlocked first.

The switch-based match 3 game, comprising a special game element, which can transform into another special game element that consume other game elements so that they are not playable or movable.]

The switch-based match 3 game, comprising special boosters, which can be obtainable free of charge.

The booster element can be obtainable free of charge by installing the game at a different platform, e.g. iPad.

The booster can be obtainable free of charge by seeking help from social network friends.

The switch-based match 3 game, comprising special boosters, which are purchasable before or during the game level.

The switch-based match 3 game, comprising special boosters, which can smash and remove any game element.

The switch-based match 3 game, comprising special boosters, which allow the game element to switch if no any combinable move on the game board is available.

The switch-based match 3 game, comprising special boosters, which allow different special game elements to exist at the start of the game level.

The switch-based match 3 game, comprising special boosters, which add five to the count of the time-counting in-game elements on the game board.

The switch-based match 3 game, comprising special boosters, which rolls over an area on the game board by transforming into striped game element and creates three line blasts.

The switch-based match 3 game, comprising special boosters, which, following its path, can chomp away any game elements and have them removed at several squares.

The switch-based match 3 game, comprising special boosters, which more than one can be mixed or combined from a certain game level.

A match 3 switcher game, in which players can see their social network friends' level position on a virtual path and where the player can play the game in offline mode on one platform/device and the progress in the game is synchronised with a central server when the device is online again and the player can continue playing the game on another platform.

A casual online game connected to a social network where social network friends are prompted to assist another player if that other player has played, but not completed, a level meeting a certain criteria; the criteria can be any of the following The player has played the level a predefined number of times, A predefined time has passed since the player first played the level.

A casual online game connected to a social network where social network friends are prompted to assist another player if that other player has played, but not completed, a level meeting a certain criteria, the help received can only be used by the player on that specific level.

A method for displaying score in a virtual game, comprising:

Measuring the score a player receives while playing a game; and

Visually representing an indication of how this score relates to one or multiple pre-defined goals;

Gathering information about the high scores of different players of the game level; and Comparing the current score of the player, the previous high score of the player and the high scores of other players; and During the play of the game, visually representing the difference between the current score, the different high scores and the pre-defined goals.

Although these ideas are generally defined in relation to a match 3 -switcher game, the ideas can be deployed in other game variants (e.g. clicker games etc.).

Summary of Other Features that may be Combined

The following features may be implemented using the techniques described herein. The features may be combinable unless expressly not.

Match 3 game
Match 4 for a special item
Match 5 for a special item
Combine special items for an explosion that clears game elements
Items are game elements
Six standard game elements with different appearance
Shiny, reflective, brightly coloured game elements; but background is matt
 If the player doesn't make a move for a pre-set time, then a possible match-3 combination of game elements is shown, with each game element briefly illuminated or otherwise highlighted
Continuous Musical Soundtrack
 If 4 game elements are combined, then a striped game element results; combining that striped game element into a match-3 combination removes all game elements in the stripe direction for the row or column of the striped game element
 The direction of the stripes of a striped game element is perpendicular to the combination that created the striped game element
 The column and line that are removed are determined by the crossing point (the cell) in which the combination is made
 If 5 game elements are combined in a line, then a special game element results; subsequently switching that special game element with an adjacent game element of a given colour then removes all game elements on the board of that colour
 If the special game element that removes all game elements of one colour is combined with a striped game element then all game elements of the striped game element's colour becomes triggered striped game elements
 If the special game element that removes all game elements of one colour is combined with another identical special game element then all game elements on the game board are removed in a sweeping motion from left to right
 Removing game elements through combinations or special game elements only removes one 'layer'
 Some special game elements or combinations of regular game elements remove more than one 'layer'
 Some elements on the game board can only be removed if an adjacent game element is removed
 Some elements 'consume' other game elements so that they are not playable or moveable
 Can only consume/move if there is a game element in an adjacent cell on the game board
 Some elements 'consume' other game elements so that they are not playable or moveable—they appear after
Time
Number of moves
Number of moves that have not performed a specific action
 Some elements 'consume' other game elements so that they are not playable or moveable
  These game elements consume other game elements in a hierarchy: 1) Regular game elements, 2) special game elements
 Some special game elements can be swapped normally, which later transforms into a random game element that can be either a positive element or an obstacle.
Positive: e.g. a striped game element, a wrapped game element, a colour bomb, a fish, a lucky game element which can transform into useful element when removed, etc.
Negative: e.g. a piece of chocolate, (which, if left unchecked, will spread), a chocolate factory, a piece of liquorice, a piece of cream of random "thickness", etc.
Congratulatory words on screen and spoken after good gameplay
Levels are timed
Levels are not timed
Levels contain non-combinable game elements that shall be moved to the last row on the screen where they disappear in order to complete the game
All non-combinable game elements to be moved are on the game board at the start
All non-combinable game elements to be moved are not on the game board at the start and will be introduced during the gameplay, when other game elements are removed
The method on how the non-combinable game elements are introduced on to the game board
Remove a certain number of some or all of the available types of matchable game elements on the game board to complete the level
The sequence of game elements is re-arranged (instead of "level failed") with the current elements on the board when no combinable moves are available during the level
Blockers
Jelly
Expanding Chocolate blocker
Frosting blocker
1 Layer Frosting
2 Layers Frosting
3 Layers Frosting
4 Layers Frosting
5 Layers Frosting
Liquorice blocker
Locked objects blocker
Game element Cannon
Chocolate fountain
Marmalade
Bomb (countdown bomb—one in each colour)
Walls
Net
Boosters (not described elsewhere)
Free Switch
Shuffle
Bomb Cooler
Sweet Teeth
Coconut liquorice
Free switcher hand
Paintbrush
Frozen clock charm
+3 Heart charm
Mix paper bag Booster fish
Booster 5 switch
Bubblegum Troll
Other In-Game Elements
Mystery Game element—One in each colour
Lucky Game element—One in each colour
Fish—One in each colour
Regular
Wrapped
Polka
Wrapped fish—One in each colour
Polka fish—One in each colour
Black Metal Game element
Time Bomb Maker
A part of the game board that moves a game element that passes through it to a different part on the game board
Levels can be completed in under 80 moves
Each level has a true fail, giving a player the option to play that level again
Failing a level is accompanied with a soothing whistling soundtrack
Succeeding at a level moves the user one step along a virtual path
The virtual path is set on a candy themed fantasy map, which has the appearance of a physical game board that is foldable and placed on top of a table
Moving along the virtual path transports the player through different themed landscapes/areas and when entering a new landscape a sub-story begins which then ends when that landscape has been progressed through
On the virtual path there are level nodes representing each level. The level nodes have a specific look depending on what type of goal the level they represent has
Shown on all levels
Shown on all unlocked levels
    Each node can reveal a preview thumbnail of the level
    The thumbnail can show how well the player has succeeded on that level before (stars, points, place in high score list)
Game Life
    The maximum game life is set (5 times). The player will lose a life if they fail a level.
1. Players automatically gain one game life every 30 minutes free of charge.
2. Chance of purchasing game life is provided if no game life is available.
3. Seek friends' help is possible through social network Facebook. Players may send requests for more lives by clicking the icon on the screen, which will launch a Facebook pop-up, that allows the player to select friends individually
4. A special method of adding game life is to purchase the Charm of Life from which the player may increase the number of maximum lives from five to eight. The change of default life-time can be permanent through a full refill Charm of life
Players can see their social network friends' position on the virtual path
Players can see their social network friends' scores for a level, e.g. when they complete that level
Players can see their social network friends' scores for the same level they are currently playing on the star meter together with their friends' portrait
Players can post their results for a level on their Facebook wall
The player is prompted to post a message on the wall of a friend that is passed in the high score list
The player is presented with the option texted the play on the level (more moves or time) to beat one of the friends in that level.
    Can be triggered if the player is within a threshold of the friend's score on that level
Players can see the full extent of the virtual path
Number of levels in the path is being increased by the game designer every few days or weeks
Every interaction is accompanied with sound and a visual feedback
When a level is failed, the player is offered extra moves to purchase
The player can buy in-app boosters and charms to help with the current level
    Boosters can be bought before a level
    Boosters can be bought during a level
There is a booster that lets the player switch two game elements that do not match
There is a booster that gives additional time for the player to complete a timed level Coconut Wheel, a booster that rolls over an area on the game board by transforming into striped game element and creates (3) line blasts
The method to define where the coconut wheel is to roll (if that is not defined by the user)
A booster that instantly gives 5 extra moves
A booster that inserts special elements (jelly fishes) on the game board, which clears three pieces of jelly when matched
A booster that lets the player start a level with a colour bomb three times
A booster that lets the player start a level with one bomb and one lineblast 3 times
Lollipop booster: A booster that may smash and remove any game element
Stripe & wrap booster: A booster that gives a striped game element and a wrapped game element at the beginning of the game
Shuffle Game element: A booster that allows the player to shuffle the game element on the board if no any good move is available
Bomb Cooler booster: A booster that adds five to the count of all the visible bombs on the game board
Boosters can be permanent and available to the player for all levels or they can be non-permanent and need to be topped-up through purchases or help from friends
The player can choose to use boosters both before starting a level and during the play of a level
In-app purchases are bought by touching an icon of the booster, shown next to the gameplay board, and then by touching a 'buy' button that is subsequently displayed
At some levels, the player may ask friends from their social network for help
Social network friends can provide a player with boosters and extra moves
Social network friends are prompted to help out if the player has been 'stuck' on a level for a specified time without completing the level
    The received help can only be used for that specific level where the player has been stuck
    The player can receive help from several friends (can in different implementations use help from several friends or only from one friend)
Social network friends are prompted to help out if the player has played a level a certain number of times without completing the level
Social network friends are prompted to help if the player has run out of game life and wish to continue the game The help that can be sent to a stuck friend can be extra moves to be used for free in that specific level That the player has received help from a friend is indicated on the overview map in relation to the level where the help can be used In one implementation if the player has completed the level using the help from a specific friend a 'thank you' message is sent to the helping friend.

That message can be an item of value

The message can be a message only

The helping friend can get another benefit

The helping friend can get recognition

A player that is stuck can 'buy' himself past that level with help from friends—receiving help/unlocking from a plurality of friends gets the player past the level All levels require the player to combine game elements in various combinations Successive levels can have different difficulty rankings—e.g. after a tough level, there is an easy level Goal for successive levels may change—e.g. one level may require the player to clear all the jellies, and the next may require the player to bring down all the special non-candy foods. Or successive levels may require jellies to be cleared, but have very different shapes of the game board and blockers.

A goal may be to collect, by making combos, a certain amount of game elements, special game elements or specific combos in order to complete a level Fully sync'd across iOS, desktop and Android via Facebook Some levels are designed to be exceptionally difficult to succeed at through skill alone Game is free to play, but in-game purchases can be made for boosters/charms to help gameplay The tutorial of the game spans over the first six levels The game board's grid has a maximum size of 9×9.

The invention claimed is:

1. A computer implemented method, said method being performed in a computing device, comprising one or more processors and a display, by executing computer code on said one or more processors to perform the steps of:
   controlling the display to show game graphics showing a gameboard with multiple game elements, wherein each of said multiple game elements comprises a visual characteristic of a plurality of different visual characteristics, and each game element has one of a plurality of different sizes, wherein a set of game elements may be matched by a player if said game elements of said set of game elements have a visual characteristic of said plurality of different visual characteristics in common;
   when a match of game elements is made, controlling the display to show a game element of said set of game elements of a new size, said new size being dependent on said sizes of the game elements of said set of game elements;
   determining if said new size is a maximum size; and
   if it is determined that said new size is a maximum size, controlling the display to show said game element of said new size being removed from the gameboard.

2. The method of claim 1 in which a processor is programmed so that there are multiple levels of evolution of a game element.

3. The method of claim 1 further comprising, if it is determined that said new size is said maximum size, controlling the display to show the game element of said new size appearing to explode or detonate.

4. The method of claim 1 further comprising if it is determined that said new size is a maximum size, controlling the display to increase the size on the display of one or more game elements which have a visual characteristic of said plurality of visual characteristics in common with said game element of said new size.

5. The method of claim 1 in which a processor is programmed so that a goal of a level is to grow or evolve as many elements as far as possible in a certain number of moves, or a certain time limit.

6. The method of claim 1 in which a processor is programmed so that a goal of a level in the game is to cause a plurality of game elements to be of said maximum size.

7. The method of claim 1 in which a processor is further programmed to perform the steps of:
   controlling the display to show a game object;
   in response to a switch of game elements being made by the player, controlling the display to show the game object move across the gameboard, wherein the game object is configured to cause the removal from the gameboard of game elements of said set of game elements having a size greater than a predefined size.

8. The method of claim 1 in which a processor is programmed to control the display to show game elements of said set of game elements as one or more of the following: vegetables, fruit, candies, or flowers.

9. The method of claim 1 in which a processor is programmed so that the game is a match 3 game and the processor is programmed to control the display to show the game elements as peppers.

10. The method of claim 1 in which some or all game levels have no time limit.

11. The method of claim 1 in which the game is a casual, social game and some or all levels have a true fail.

12. The method of claim 1, in which said one or more processors are programmed to perform the steps of: controlling the device to play a continuous musical soundtrack during gameplay.

13. The method of claim 1, further comprising controlling the display to display congratulatory messages when the player scores more than a predefined amount, or matches more than a predefined number of game elements, in a single move.

14. The method of claim 1, further comprising: automatically detecting when there are no possible moves left.

15. The method of claim 1, further comprising controlling the display to show the set of game elements being re-shuffled on the game board.

16. The method of claim 1, further comprising controlling the display to show, if no move has been made for a while, help or hints by brightening and enlarging game elements used in a possible move on the board with a flashing animation.

17. The method of claim 1, further comprising requiring a player to reach a target score before running out of moves in order to complete a level successfully, wherein the level has no time limit.

18. The method of claim 1, further comprising automatically replenishing a life for a player in response to the expiry of a predefined time period.

19. The method of claim 1, further comprising, if a player finishes a level in under the target number of moves, controlling the display to show game elements randomly selected from said set of game elements on the game board being removed and giving the player bonus points.

20. The method of claim 1, further comprising, if a level is finished with moves left, those moves are converted to special game elements that trigger for extra bonus points.

21. The method of claim 1 in which said one or more processors are programmed to perform the step of controlling the computing device to transmit a message comprising a request for lives to a social network contact of the player.

22. The method of claim 1 in which said one or more processors area programmed to perform the step of controlling the computing device to transmit a message comprising a request for help to a social network contract of the player.

23. The method of claim 1 in which said one or more processors are programmed to perform the step of controlling the computing device to transmit a message to a player of a further device, said messaging comprising a prompt to assist said player of said computing device if said player of said computing device has played, but not completed, a level meeting a certain criteria.

24. The method of claim 1 in which said one or more processors are programmed to perform the step of controlling the computing device to transmit a message comprising an in game item to a social network contact of said player.

25. The method of claim 1 in which a processor is programmed so that the game can be synchronized between different devices.

26. The method of claim 1 in which a processor is programmed so that a player can seamlessly stop and re-start playing the game at any time since game state information is stored remotely or on the playing device.

27. The method of claim 1, further comprising, in response to changes in game state and every change in every game piece on the game board, controlling the computing device to provide sound and visual feedback.

28. The method of claim 1 in which game state information is preserved, enabling a remote server system to identify a player and all aspects of the state of the game they are playing, so that the player can end game play on one device and resume from a different device at a later time at exactly the same state.

29. The method of claim 28 in which the different device can be a different type of device, so that the player can move seamlessly between playing the game on a smartphone and on a tablet.

30. The method of claim 1 in which a remote server system can identify a player because that player has accessed the game through a social network.

31. The method of claim 1 in which the game is a casual, social game, wherein said game can be downloaded as an app to a smartphone or tablet computer and which can be accessed or played using a social network application or environment.

32. The method of claim 1 in which the processor is programmed to control the display to show a virtual path or other virtual world that indicates the level reached by the player and one or more of said player's social network friends.

33. The method of claim 1 in which the design of the game is optimised through a process including the step of: using data analytics to understand the impact of changes to the game design in terms of at least one of: player engagement, or monetization, or viralisation and implementing changes to the game design.

34. A computing device adapted to play a computer game, the device including one or more processors, a memory, a display, a touch screen or a cursor based input device, and computer code stored in device memory, and in which said processor executes said computer code to perform the steps of:
controlling the display to show computer game graphics showing a gameboard with multiple game elements, wherein each of said multiple game elements comprises a visual characteristic of a plurality of different visual characteristics, and each game element has one or a plurality of different sizes, wherein a set of game elements may be matched by a player if said game elements of said set of game elements have a visual characteristic of said plurality of different visual characteristics in common;
when a match of game elements is made, controlling the display to show a game element of said set of game elements of a new size, said new size being dependent on said sizes of the game elements of said set of game elements;
determining if said new size is a maximum size; and
if it is determined that said new size is a maximum size, controlling the display to show said game element of said new size being removed from the gameboard.

35. A non-transitory computer readable medium encoded with instructions for controlling a computer system comprising one or more processors and a display, and in which the instructions are executed on said one or more processors to perform the steps of:
controlling the display to show game graphics showing a gameboard with multiple game elements, wherein each of said multiple game elements comprises a visual characteristic of a plurality of different visual characteristics, and each game element has one of a plurality of different sizes, wherein a set of game elements may be matched by a player if said game elements of said set of game elements have a visual characteristic of said plurality of different visual characteristics in common;
when a match of game elements is made, controlling the display to show a game element of said set of game elements of a new size, said new size being dependent on said sizes of the game elements of said set of game elements;
determining if said new size is a maximum size; and
if it is determined that said new size is a maximum size, controlling the display to show said game element of said new size being removed from the gameboard.

* * * * *